(12) United States Patent
Weintrob et al.

(10) Patent No.: US 10,703,996 B2
(45) Date of Patent: *Jul. 7, 2020

(54) SELECTIVE NAPHTHA REFORMING SYSTEMS

(71) Applicant: Phillips 66 Company, Houston, TX (US)

(72) Inventors: Edward C. Weintrob, Owasso, OK (US); Sundararajan Uppili, Bartlesville, OK (US); Clark A. Miller, Bartlesville, OK (US); Tushar V. Choudhary, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/106,948

(22) Filed: Aug. 21, 2018

(65) Prior Publication Data

US 2019/0062651 A1 Feb. 28, 2019

Related U.S. Application Data

(60) Provisional application No. 62/549,212, filed on Aug. 23, 2017.

(51) Int. Cl.
| | |
|---|---|
| *C10G 63/02* | (2006.01) |
| *B01J 21/04* | (2006.01) |
| *C10G 35/06* | (2006.01) |
| *C10G 50/00* | (2006.01) |
| *C10G 7/00* | (2006.01) |
| *B01J 23/89* | (2006.01) |

(Continued)

(52) U.S. Cl.
CPC ............. *C10G 63/02* (2013.01); *B01J 21/04* (2013.01); *B01J 23/005* (2013.01); *B01J 23/60* (2013.01); *B01J 23/626* (2013.01); *B01J 23/8966* (2013.01); *C10G 7/00* (2013.01); *C10G 35/06* (2013.01); *C10G 50/00* (2013.01); *B01J 2523/42* (2013.01); *B01J 2523/43* (2013.01); *B01J 2523/82* (2013.01); *C10G 2300/1085* (2013.01); *C10G 2400/20* (2013.01); *C10G 2400/22* (2013.01); *C10G 2400/30* (2013.01)

(58) Field of Classification Search
None
See application file for complete search history.

(56) References Cited

U.S. PATENT DOCUMENTS

| | | | | |
|---|---|---|---|---|
| 4,897,177 A | * | 1/1990 | Nadler | C10G 35/095 208/135 |
| 5,292,976 A | * | 3/1994 | Dessau | C10G 59/02 208/100 |

* cited by examiner

*Primary Examiner* — Derek N Mueller
(74) *Attorney, Agent, or Firm* — Phillips 66 Company

(57) ABSTRACT

Systems for reforming a feedstock comprising paraffins and naphthenes. A first reactor containing a first reforming catalyst is operable to maintain a temperature and pressure that facilitates conversion of naphthenes in the feedstock to aromatics while facilitating conversion of less than 50 wt. % of paraffins in the feedstock to olefins. A first separator receives and separates the first effluent that is produced in the first reactor to produce a first fraction enriched in aromatics and a second fraction enriched in paraffins. A second reactor containing a second reforming catalyst is operable to maintain a temperature and pressure that facilitates conversion of at least 50 wt. % of paraffins in the second fraction to olefins. The system is operable to produce a liquid hydrocarbon product suitable for use as a blend component of a liquid transportation fuel.

18 Claims, 4 Drawing Sheets

(51) Int. Cl.
*B01J 23/00* (2006.01)
*B01J 23/62* (2006.01)
*B01J 23/60* (2006.01)

SELECTIVE NAPHTHA REFORMING SYSTEMS

CROSS-REFERENCE TO RELATED APPLICATIONS

This application is a non-provisional application which claims the benefit of and priority to U.S. Provisional Application Ser. No. 62/549,212 filed Aug. 23, 2017, entitled "Selective Naphtha Reforming Processes," which is hereby incorporated by reference in its entirety.

STATEMENT REGARDING FEDERALLY SPONSORED RESEARCH OR DEVELOPMENT

None.

FIELD OF THE INVENTION

The present invention relates to processes and systems for upgrading hydrocarbons by catalytic reforming.

BACKGROUND

Known methods for upgrading refinery naphtha streams have inherent drawbacks. Feedstock streams mainly comprising hydrocarbons containing four to five carbon atoms (C4-C5) are typically characterized by high octane ratings, but also high vapor pressures that exceed government specifications for liquid transportation fuels such as gasoline. These specifications often require either upgrading of the C4 and C5 hydrocarbons to products characterized by lower vapor pressure or exclusion from the gasoline pool.

C6+ naphtha feed streams typically exhibit low vapor pressure, but are typically also characterized by a low octane rating and must be upgraded to products comprising a higher-octane rating via naphtha reforming. Conventional naphtha reforming efficiently and selectively converts naphthenes (cycloalkanes) into aromatics, but is non-selective for the conversion of paraffins to aromatics, resulting in low aromatics yields from paraffins feeds. Further, C4-C5 paraffins are not upgraded in conventional naphtha reformers, since these paraffins cannot form aromatics. Thus, while solutions for isolated hydrocarbon streams exist, a practical process for efficiently upgrading a naphtha stream comprising both light C4-C5 hydrocarbons as well as C6+ hydrocarbon components currently does not exist.

Described herein are unique processes and systems that improve the reforming of a hydrocarbon feedstock by selectively reforming discrete sub-components of the feedstock using at least two structurally-distinct reforming catalysts. Advantages of the inventive processes and systems include (but are not limited to) increasing the yield of a liquid hydrocarbon reformate that is characterized by at least one of an increased octane rating and decreased vapor pressure. A further advantage is a decreased rate of reforming catalyst coking and deactivation.

BRIEF SUMMARY OF THE DISCLOSURE

Certain embodiments of the invention comprise a system for reforming a hydrocarbon feedstock, comprising: A system for reforming a hydrocarbon feedstock, comprising: a) a first reforming unit that contains a first reforming catalyst comprising a solid support that contains acidic sites, where the first reforming unit is operable to receive a hydrocarbon feedstock comprising paraffins and naphthenes, each of which comprises from four to twelve carbon atoms, where the hydrocarbon feedstock is characterized by a boiling point range from about −12° C. to about 230° C. The first reforming unit is further operable to facilitate contact between the hydrocarbon feedstock and the first reforming catalyst to produce a first reformer effluent comprising predominantly aromatics, the first reforming reactor also operable to maintain a temperature, a pressure and a hydrogen to hydrocarbon ratio that facilitates the catalytic aromatization of naphthenes in the feedstock by the first reforming catalyst, while simultaneously facilitating the catalytic dehydrogenation, catalytic cracking, or both, of less than 50% of paraffins (optionally, less than 40 wt. % of paraffins) in the hydrocarbon feedstock; b) a separation unit operable to separate the first reformer effluent into a first fraction that comprises an increased percentage (by weight) of aromatics relative to the first reformer effluent, and a second fraction that comprises an increased percentage (by weight) of paraffins relative to the first reformer effluent; c) a second reforming unit that contains a second reforming catalyst comprising a solid support that does not contain acidic sites, where the second reforming unit is operable to receive the second fraction and facilitate contact between the second fraction and the second reforming catalyst and further operable to maintain a temperature, a pressure and a hydrogen to hydrocarbon ratio that are suitable to facilitate catalytic dehydrogenation of at least 50 wt. % of paraffins present in the second fraction to produce a second reformer effluent comprising predominantly olefins containing four or five carbon atoms and unreacted paraffins, where the second reformer effluent is characterized by an increased research octane number relative to the second fraction.

In certain embodiments, the system further comprises a distillation unit operable to separate the second reformer effluent into a light hydrocarbons fraction comprising hydrocarbons containing one to four carbon atoms, and a heavy hydrocarbons fraction comprising hydrocarbons containing five or more carbon atoms.

Certain embodiments further comprise an oligomerization reactor containing an oligomerization catalyst, where the oligomerization reactor is operable to receive the light hydrocarbon fraction produced by the distillation apparatus and facilitate contact between the light hydrocarbon fraction and the oligomerization catalyst at conditions of temperature and pressure suitable to produce an oligomerization product comprising larger hydrocarbons containing five or more carbon atoms (optionally, six or more) that are characterized by a decreased vapor pressure relative to the light hydrocarbon fraction.

In certain embodiments, the second reforming unit is additionally operable to receive a supplemental light paraffins stream comprising paraffins containing four or five carbon atoms and further operable to facilitate mixing of the supplemental light paraffins stream with the second fraction at a point that is upstream from the second reforming catalyst.

In certain embodiments, the first reforming catalyst comprises a structure that is adversely affected by contact with steam, wherein the second reforming catalyst comprises a structure that is not adversely affected by contact with steam. In certain embodiments, the first reforming catalyst comprises a solid support selected from zeolite, silica, alumina, chlorided alumina and fluorided alumina. In certain embodiments, the first reforming catalyst is a bi-functional naphtha reforming catalyst that additionally comprises at least one metal selected from Group VIIB, Group VIIIB, Group IIB, Group IIIA and Group IVA of the Periodic Table. In certain embodiments, the first reforming catalyst further comprises at least one metal selected from Pt, Ir, Rh, Re, Sn, Ge and In.

In certain embodiments, the second reforming catalyst comprises a solid support consisting of Group II aluminate spinels according to the formula $M(AlO_2)_2$ or $MO \cdot Al_2O_3$, wherein M is a divalent Group IIA or Group IIB metal. In these same embodiments, the second reforming catalyst optionally further comprises a catalytically-effective amount of at least one metal from Group VIIIB of the Periodic Table. In these same embodiments, the second reforming catalyst further comprises at least one co-promoter selected from the group consisting of As, Sn, Pb, Ge and Group IA metals.

In certain embodiments, the hydrocarbon feedstock comprises at least one of: a refinery raffinate, hydrotreated straight run naphtha, coker naphtha, hydrocracker naphtha, hydrotreated hydrocracker naphtha, refinery hydrotreated heavy naphtha, refinery hydrotreated coker naphtha, or C4+ hydrocarbons derived from natural gas liquids.

In certain embodiments, the boiling point range of the hydrocarbon feedstock ranges from about 27° C. to about 230° C., comprising hydrocarbons that contain from five to twelve carbon atoms. In certain embodiments, the boiling point range of the hydrocarbon feedstock ranges from about 27° C. to about 185° C., comprising at least hydrocarbons that contain from five to ten carbon atoms.

In certain embodiments, the first reforming unit is operable to receive a stream of hydrogen and further operable to maintain a hydrogen to hydrocarbon feedstock ratio of at least 2:1, optionally, at least 4:1. In certain embodiments, the second reforming unit is operable to receive a stream of hydrogen and further operable to maintain a hydrogen to hydrocarbon ratio of 0.7:1 or less.

In certain embodiments, the second reforming unit is operable to maintain a temperature and pressure that facilitates the catalytic dehydrogenation of at least 60 wt. %, (optionally at least 70 wt. %, optionally, at least 80 wt. %), of the paraffins in the second fraction by the second reforming catalyst.

BRIEF DESCRIPTION OF THE DRAWINGS

A more complete understanding of the present invention and benefits thereof may be acquired by referring to the follow description taken in conjunction with the accompanying drawings in which.

Figure 1:
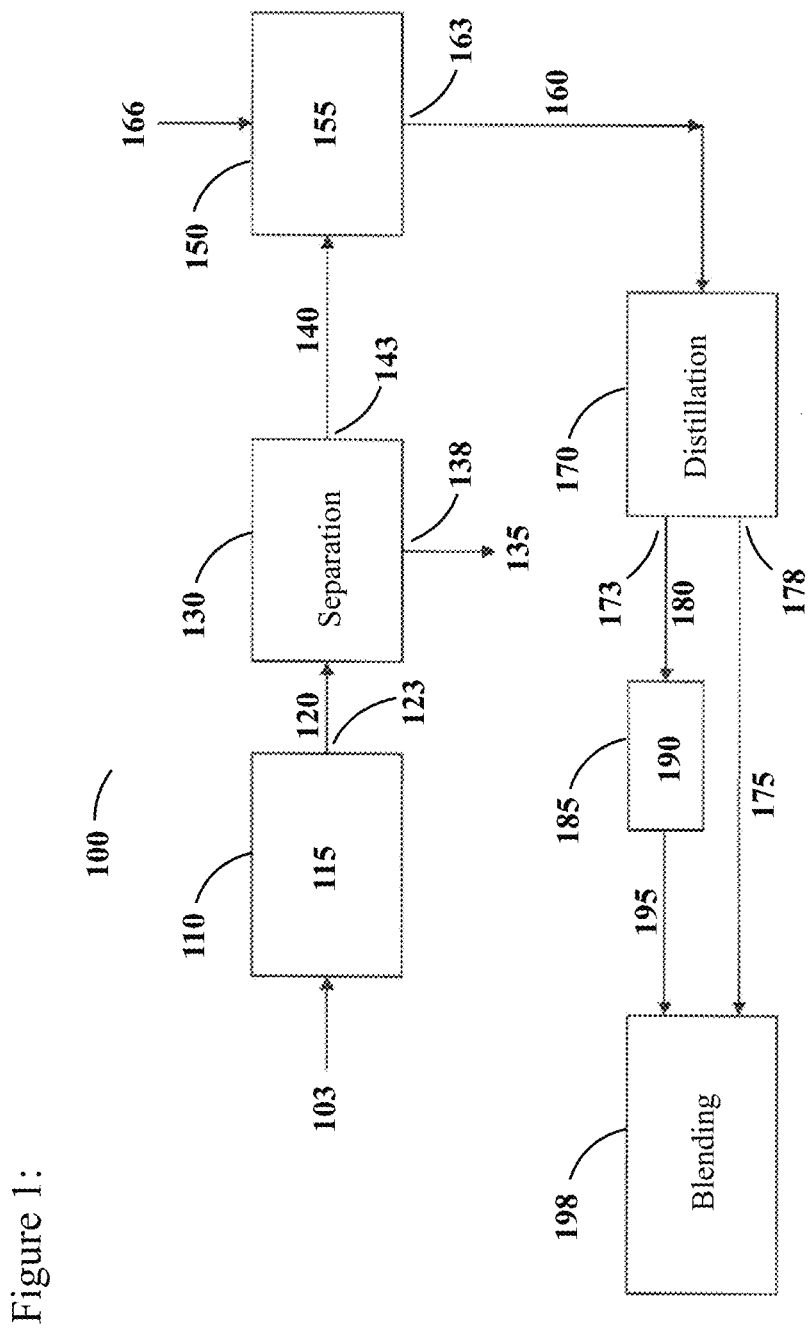
FIG. 1 is a simplified schematic representative of a first embodiment of the inventive processes and systems disclosed herein.

The invention is susceptible to various modifications and alternative forms, specific embodiments thereof are shown by way of example in the drawings. The drawings may not be to scale. It should be understood that the drawings are not intended to limit the scope of the invention to the particular embodiment(s) illustrated.

DETAILED DESCRIPTION

Disclosed herein are processes and systems for improving the upgrading of a hydrocarbon feedstock that selectively reforms the paraffinic and naphthenic components of the feedstock by separately reforming each component. The paraffins are reformed by contact with a catalyst that is structurally distinct from the catalyst used to reform the naphthenic hydrocarbons. Reforming conditions (e.g., temperature, pressure, etc.) are utilized that maximize the conversion of each component to products suitable for use as a liquid transportation fuel (e.g., gasoline), or a blend component thereof. When compared to conventional reforming processes and systems, the inventive processes and systems disclosed herein may exhibit one or more of the following benefits, including increased yield of a liquid reformate product, improved properties of a liquid reformate product (e.g., increased octane rating and decreased vapor pressure) and decreased rate of reforming catalyst coking and/or deactivation.

The main objective of catalytic reforming in a refinery setting is to improve the octane rating of a hydrocarbon feedstock. This is achieved predominantly by converting naphthenes and paraffins in the feedstock to aromatics. Conversion of paraffin to aromatics requires more severe process parameters, while the conditions required to convert naphthenes to aromatics are relatively mild. Aromatics do not require conversion and are left unreacted. Conventional reforming processes often sequentially reform a hydrocarbon feedstock utilizing multiple reactors set to operate at increasingly severe conditions. In such processes, most naphthenes are converted to aromatics in an initial reactor using mild conditions, followed by paraffin upgrading to aromatics in a subsequent reactor under more severe conditions. However, reforming of each component suffers by failure to separate the feedstock or the intermediate products (or both).

In contrast, a first embodiment of the present inventive systems and processes convey the entire hydrocarbon feedstock through a first reforming unit containing a first reforming catalyst that is maintained under conditions that predominantly convert naphthenes in the hydrocarbon feedstock to aromatics, while allowing most paraffins (and, optionally aromatics) present in the hydrocarbon feedstock to pass through the first reforming unit unreacted. The first reforming unit effluent is separated into a first fraction predominantly comprising (n- and iso-) paraffins, and a second fraction comprising predominantly cyclic hydrocarbons (i.e. mostly aromatics, with some residual unconverted naphthenes) that is suitable for use as a blend component of a liquid transportation fuel (i.e., gasoline). The first fraction comprising paraffins is sent to a selective reforming process configured to convert paraffins to products that are characterized by higher octane rating and lower vapor pressure, and that are suitable for use as a blend component of a liquid transportation fuel.

Certain alternative embodiments of the present inventive systems and processes first split a hydrocarbon feedstock into a first fraction comprising predominantly paraffins (n-paraffins and iso-paraffins), and a second fraction predominantly comprising cyclic hydrocarbons (predominantly naphthenes and aromatics). The first fraction and the second fraction are then each upgraded separately, in separate reforming units comprising distinct reforming catalysts.

FIG. 1 depicts a diagram representing a first exemplary embodiment of the present inventive processes and systems. A selective reforming system 100 upgrades a hydrocarbon feedstock 103 comprising at least paraffins and naphthenes, and optionally aromatics. The hydrocarbon feedstock 103 is fed to a first reforming unit 110 that is a reactor containing at least a first reforming catalyst 115. The first reforming unit 110 is a reactor operated at mild conditions that selectively convert most naphthenes in the hydrocarbon feedstock 103 to aromatics, while any aromatics in the hydrocarbon feedstock 103 pass through the first reforming unit largely unreacted. Further, the mild conditions (i.e., temperature, pressure, H2:hydrocarbon feed ratio, etc.) maintained in the first reforming unit also prevent the catalytic dehydrogenation, catalytic cracking, or both, of paraffins present in the hydrocarbon feedstock 103.

Generally speaking, the reaction conditions maintained within the first reforming unit include a temperature in the range from 800° F. (454° C.) to 1100° F. (593° C.); alternatively, in the range from 850° F. (454° C.) to 1050° F. (565° C.); alternatively, in the range from 900° F. (482° C.) to 1000° F. (538° C.). The pressure maintained within the first reforming unit is in the range from 3 Bar to 30 Bar, alternatively from 10 Bar to 28 Bar, alternatively from 15 Bar to 28 Bar, alternatively from 22 Bar to 26 Bar. In certain embodiments, the molar ratio of hydrogen to hydrocarbon (H2:HC) at the inlet to the first reforming unit ranges from 2:1 to 15:1, alternatively, ranges from 3:1 to 8:1, alternatively ranges from 4:1 to 7:1.

Again, referring to FIG. 1, upon entering the first reforming unit 110, the hydrocarbon feedstock 103 contacts the first reforming catalyst 115, which catalytically facilitates conversion of the hydrocarbon feedstock 103 to produce a first reactor effluent 120 that is characterized by an increased octane rating relative to the feed and a lower vapor pressure relative to conventional, 1-step reforming. The first reactor effluent 120 is conveyed out the first reforming unit 110 via at least one first reactor outlet 123.

Generally speaking, the first reforming catalyst comprises at least one fixed bed of catalyst that is contained within the first reforming unit. The fixed bed of catalyst may optionally be employed in a swing reactor configuration for convenient regeneration of the catalyst. In alternative embodiments, the first reforming unit may contain a moving bed, fluidized bed, staged fluidized bed or ebullated bed to allow continuous regeneration, or utilize any other known catalyst bed configuration that may be advantageously utilized in a given embodiment. Such catalyst bed configurations are well-understood in the art, and thus, will not be discussed further here.

Referring again to the embodiment depicted in FIG. 1, upon leaving the first reforming unit 110, the first reactor effluent 120 is next conveyed to a separation unit 130 that is operable to separate cyclic hydrocarbons (i.e., aromatics and at least a portion of any residual naphthenes present) from paraffins. Speaking in general terms, the separation unit may separate molecules based on solvent extraction (e.g., an aromatic extraction unit), selective adsorption, or any other conventional separation technology. For embodiments where the separation unit comprises an aromatics extraction unit, separation is achieved by conventional processes known as extractive distillation or extraction.

Referring again to the embodiment depicted in FIG. 1, the separation unit 130 separates the first reactor effluent 120 into a first fraction 135 that leaves the separation unit 130 by a first separation unit outlet 138 and a second fraction 140 predominantly comprising paraffins that leaves the separation unit 130 via a second separation unit outlet 143. The first fraction 135 comprises predominantly aromatics (with some residual unreacted naphthenes and paraffins), while the second fraction 140 comprises predominantly paraffins (n-paraffins and iso-paraffins) containing six to seven carbon atoms.

The second fraction 140 is next conveyed to a second reforming unit 150. One advantage of the present process and system is that separation of cyclic hydrocarbons from paraffins by the separation unit 130 significantly decreases the quantity of aromatics and naphthenes that enter the second reforming unit 150, which is advantageously configured to convert paraffins with increased efficiency in the absence of such naphthenes and aromatics. In certain embodiments, the separation unit 130 is operable to exclude >95 wt. %, >98 wt. %, or even >99 wt. % of aromatics in the first reactor effluent 120 from the second fraction 140. The first fraction 135 may be utilized directly for blending into gasoline or other liquid transportation fuel, optionally, subjected to further upgrading prior to blending.

Again, referring to the embodiment depicted in FIG. 1, the second reforming unit 150 comprises at least a second reforming catalyst 155, which catalytically facilitates conversion of the raffinate fraction 140 to a second reactor effluent 160 that leaves the second reforming unit via at least one outlet 163. Speaking generally, the reaction conditions maintained in the second reforming unit are generally operating conditions suitable for the steam-stable second reforming catalyst, including a temperature in the range from 750° F. (399° C.) to about 1250° F. (677° C.); alternatively, in the range from 850° F. (454° C.) to 1100° F. (593° C.); alternatively, in the range from 900° F. (482° C.) to 1000° F. (538° C.). In certain embodiments, the first reforming unit is maintained at a reforming temperature that is 480° C. or less; optionally, ranging from 440° C. to 485° C.; optionally, ranging from 445° C. to 480° C.; optionally, ranging from 460° C. to 480° C.; optionally, ranging from 470° C. to 480° C.; optionally, ranging from 465° C. to 475° C.; optionally, ranging from 455° C. to 470° C. The pressure maintained in the second reforming unit is generally in the range from 1 Bar to 34.5 Bar; alternatively, in the range from 3 Bar to 20 Bar; alternatively, in the range from 2 Bar to 10 Bar; alternatively, in the range from 2 Bar to 6 Bar. The molar ratio of hydrogen to hydrocarbon ($H_2$:HC) maintained inside the second reforming unit is within the range from 0 to 1, alternatively from 0.15 to 0.85, alternatively from 0.3 to 0.7. The molar water to hydrocarbon ratio ($H_2O$:HC) maintained within the second reforming unit is in the range from 0.1:1 to 10:1, alternatively in the range from 1:1 to 6:1, alternatively, in the range from 2:1 to 6:1. The diluent liquid weight hourly space velocity (grams per hour of diluent/grams catalyst) maintained within the second reforming unit is in the range from 0.1 to 30, alternatively in the range from 1:1 to 6:1. The diluent may be, but is not limited to $CO_2$, $H_2O$ (as steam) or $N_2$. A low to moderate liquid weight hourly space velocity (LWHSV) is utilized that is in the range from 0.5 to 12 $hr^{-1}$ on a weight hydrocarbon rate per weight catalyst basis; alternatively ranging from 2 to 8 $hr^{-1}$; alternatively ranging from 1 to 3 $hr^{-1}$; alternatively ranging from 1.5 to 2.5 $hr^{-1}$.

Speaking generally, the second reforming unit is configured to operate with higher efficiency when converting a highly paraffinic feedstock (e.g., a highly-paraffinic AEU raffinate) rather than a feedstock that comprises a significant percentage of naphthenes and/or aromatic hydrocarbons. The conditions and second reformer catalyst that are utilized in the second reforming unit cause a feedstock predominantly comprising paraffins to be efficiently converted to desired hydrocarbon products (i.e., olefins, iso-olefins, aromatics, etc.) that are characterized by an increased octane rating, a decreased vapor pressure, or both. In all embodiments, the second reforming catalyst and conditions utilized in the second reforming unit are configured to also minimize cracking reactions that produce undesirable light hydrocarbons (C1-C4) comprising less than five carbons, as such products are not easily utilized in liquid hydrocarbon fuels such as gasoline due to vapor pressure regulations.

In certain embodiments, the second reforming unit is fed a raffinate feedstock produced by an aromatic extraction unit that comprises predominantly n-paraffins and iso-paraffins containing 6-7 carbons (C6-C7), and typically less than 15 wt. % naphthenes and aromatics (combined weight), alternatively, less than 10 wt. % naphthenes and aromatics (combined weight). Certain embodiments mix a co-feed stream of mixed pentane and/or butanes with the second fraction. This mixing may occur just upstream from the second reforming unit, alternatively, inside the second reforming unit. The co-feed stream may be derived from a variety of sources, including, but not limited to, a fraction of natural gas liquids or condensate. In these embodiments, the second reforming unit predominantly converts C5 paraffins to C5 olefins, C6 paraffins to C6 olefins and C7 and larger paraffins (C7+) to C7+ aromatics (e.g., alkyl aromatics). In this way, the second reforming unit achieves highly selective (or preferential) conversion of C5 paraffins to olefins, while maintaining highly selective conversion of C6 and C7 paraffins to higher value products that are suitable for use as a gasoline blend component. It is often preferable to selectively convert C6 paraffins to C6 olefins rather than aromatics, because this decreases production of benzene. Government regulations strictly limit the concentration of benzene in the final product gasoline due to toxicity concerns. However, it is desirable to maximize the conversion of C7+ paraffins to C7+ aromatics (i.e., alkyl aromatics) rather than C7+ olefins, as C7+ aromatic compounds are typically characterized by higher octane ratings than comparably-sized olefins. The second reforming unit is configured to minimize cracking reactions. However, any light hydrocarbons (C1-C4) that are present in the second reformer effluent may optionally be routed to an oligomerization unit (described in greater detail below).

In certain embodiments, the paraffinic feed that is fed to the second reforming unit may additionally comprise a supplemental co-feed stream comprising predominantly pentanes (optionally, butanes) that is mixed with the second fraction 140 at a location downstream from the separation unit 130. In the embodiment depicted in FIG. 1, a supplemental light paraffins stream 166 is fed directly to the second reforming unit 150, although alternative embodiments (not depicted) may mix a light paraffins stream with the second fraction at a location immediately upstream from the second reforming unit. The light paraffins stream may be derived from a variety of sources in a modern refinery, or may comprise a fraction derived from natural gas liquids. Addition of a supplemental light paraffins stream may be particularly advantageous in cooler climates or during cooler seasons, when atmospheric temperatures allow the blending of smaller olefins into gasoline while still meeting or exceeding governmental vapor pressure regulations for the final gasoline product. Alternatively, light olefins produced by the second reforming unit may be oligomerized downstream, as will be discussed in greater detail below.

Referring again to the embodiment depicted in FIG. 1, the second reformer effluent 160 is conveyed to a distillation unit 170. The distillation unit 170 operates in a conventional manner to separate a light hydrocarbons fraction 180 comprising from one to four carbons (C1-C4) from larger (C5+) hydrocarbons by boiling point. In certain alternative embodiments, the distillation unit separates hydrocarbons comprising from one to five carbon atoms (C1-C5) from hydrocarbons containing six or more carbon atoms (C6+). In the embodiment depicted in FIG. 1, the light hydrocarbons fraction 180 exits the distillation unit 170 through a first distillation unit outlet 173 and is conveyed to an oligomerization unit 185 comprising an oligomerization catalyst 190. The oligomerization unit 185 operates in a conventional manner to convert the light hydrocarbons fraction 180 to larger hydrocarbons 195 that are suitable for use as a blend component of liquid transportation fuel, and further, are characterized by a decreased vapor pressure. Larger hydrocarbons 195 are directed to a blending unit 198 to be blended into gasoline or other liquid transportation fuel.

The distillation unit 170 further produces a heavy hydrocarbons fraction 175 comprising hydrocarbons containing five or more carbon atoms that is suitable for use as a blend component of a liquid transportation fuel (e.g., gasoline.). The heavy hydrocarbons fraction 175 exits the distillation unit 170 via a second distillation unit outlet 178 that may conveyed directly to a blending unit 198 to be blended into gasoline or other liquid transportation fuel.

One advantage of the described processes and systems are that they increase the overall product yield of liquid reformate (with decreased light gas formation) from a given quantity of hydrocarbon feedstock by selectively reforming the naphthenic component of the hydrocarbon feedstock in a first reforming unit (utilizing a first reforming catalyst), then separating the product aromatics before selectively reforming the paraffinic raffinate in a second reforming unit (utilizing a distinct, second reforming catalyst). This is achieved (at least in part) because the first reforming unit is configured to utilize one or more catalysts and conditions that efficiently convert naphthenes to high octane, low vapor pressure products that are well-suited for blending into gasoline, while simultaneously operating under low severity conditions that prevent detrimental cracking of paraffins and allow them to pass through the first reforming unit unreacted. The "low severity conditions" may include a temperature in the first reforming unit that is decreased by at least 5° C., alternatively, at least 10° C., alternatively, at least 15° C., while producing an equivalent or higher overall yield of liquid reformate product (as compared to a conventional, one reactor/unit naphtha reforming process that utilizes the same catalyst). By lowering reforming temperature, paraffin conversion in the first reforming unit is decreased to at least 50%, alternatively at least 40%, alternatively at least 30%, alternatively at least 20%, alternatively at least 10%. We have found that in certain embodiments, there is a 0.4-0.6% decrease in paraffin conversion for every 1° F. decrease in the temperature maintained in the first reforming unit. We also have found that a decrease in the temperature maintained within the first reforming unit also typically result in a 0.2-0.3 vol. % increase in liquid product yield for every 1° F. decrease in temperature.

The "low severity conditions" may further include a high hydrogen to hydrocarbon (H2:HC) ratio at the inlet to the first reforming unit that ranges from 2:1 to 15:1, alternatively, ranges from 3:1 to 8:1, alternatively ranges from 4:1 to 7:1. This ratio assists in preventing dehydrogenation of paraffins to olefins, dienes, or other coke precursors in the first reforming reactor that can lead to coking of the reforming catalyst, with a consequent decrease in catalyst lifespan.

In certain embodiments, the feedstock is separated prior to reforming to produce a naphthenes-enriched first fraction and a paraffins-enriched second fraction. Although this separation does not quantitatively separate paraffins from naphthenes, it excludes a large quantity of paraffins from the first fraction that is received and upgraded in the first reforming unit. In a typical conventional reforming process comprising an acidic naphtha reforming catalyst, a significant fraction of these paraffins crack to form light gases and increase the coking rate of the first reforming catalyst. Thus, minimizing paraffin content in the first fraction beneficially extends the lifespan of the first reforming catalyst.

Conversely, the second reforming unit is configured to selectively upgrade the paraffin-enriched second fraction with increased efficiency and a decreased rate of coke formation on the second reforming catalyst (as compared to a reforming process where the feedstock to the second reforming unit comprises a significant percentage of cyclic hydrocarbons). The second reforming unit is configured to utilize one or more second reformer catalyst(s) and conditions that selectively convert the paraffinic feed in the absence of cyclic hydrocarbons with high efficiency and decreased rate of coke formation. In certain embodiments, the second reforming unit comprises at least one fixed catalyst bed, which in turn comprises at least one second reformer catalyst. Such a fixed bed configuration may be employed in a swing reactor configuration. In alternative embodiments, the second reforming unit may comprise a moving bed, fluidized bed, staged fluidized bed, ebullated bed, or any other configuration deemed advantageous to employ the first reformer catalyst utilized in a given embodiment, as is well-understood in the art.

Typically, the temperature maintained within the second reforming unit is in the range from 800° F. (484° C.) to 1200° F. (649° C.); alternatively, in the range from 900° F. (484° C.) to 1100° F. (593° C.); alternatively, in the range from 900° F. (484° C.) to 1000° F. (534° C.). The molar ratio of steam to the total feed provided to the second reforming unit (where total feed equals the second fraction plus any supplemental light hydrocarbons stream comprising C4 and/or C5 paraffins) is maintained at a ratio in the range from 2:1 to 19:1 (steam: hydrocarbon feed); alternatively, a ratio in the range from 2:1 to 6:1; alternatively, a ratio in the range from 2:1 to 3:1. This ratio is kept constant regardless of the absolute pressure maintained in the second reforming unit. A hydrogen co-feed is optionally added to the second reforming unit at a hydrogen to hydrocarbon molar ratio that is 1:1 or less; optionally 0.7:1 or less; optionally, 0.5:1 or less. A low to moderate liquid weight hourly space velocity (LWHSV) is utilized in the range from 0.5 to 12 hr−1 on a weight hydrocarbon rate per weight catalyst basis.

In certain embodiments, the second reforming catalyst contained within the second reforming unit converts C5 paraffins to C5 olefins and hydrogen by dehydrogenation, while simultaneously minimizing cracking reactions that produce light hydrocarbons (C1-C4). Minimizing production of light gases is desirable, as this correlates with maximizing the yield of products suitable for use as gasoline or a blend component thereof. Other side products produced in the second reforming unit include minor amounts of dienes, and carbon oxides. In certain embodiments, a small hydrogenation reactor located downstream from the second reforming unit receives and selectively hydrogenates dienes present in the second reformer effluent to produce a treated second reformer effluent that is then send to the distillation unit. Such hydrogenation processes and systems are conventional, and thus, will not be discussed further.

The second reforming unit additionally converts C7 paraffins with high selectivity to toluene, with minimal residual production of C7 olefins or cracked products. Conversion of C7 paraffins primarily to aromatics rather than olefins provides an additional increase in the octane rating of the product gasoline, while selective conversion of C4-C5 paraffins to C4-C5 olefins ultimately leads to products characterized by decreased vapor pressure. This is particularly true for those embodiments that subsequently oligomerize these C4-C5 olefins in an oligomerization reactor located downstream from the second reforming unit.

Figure 2:
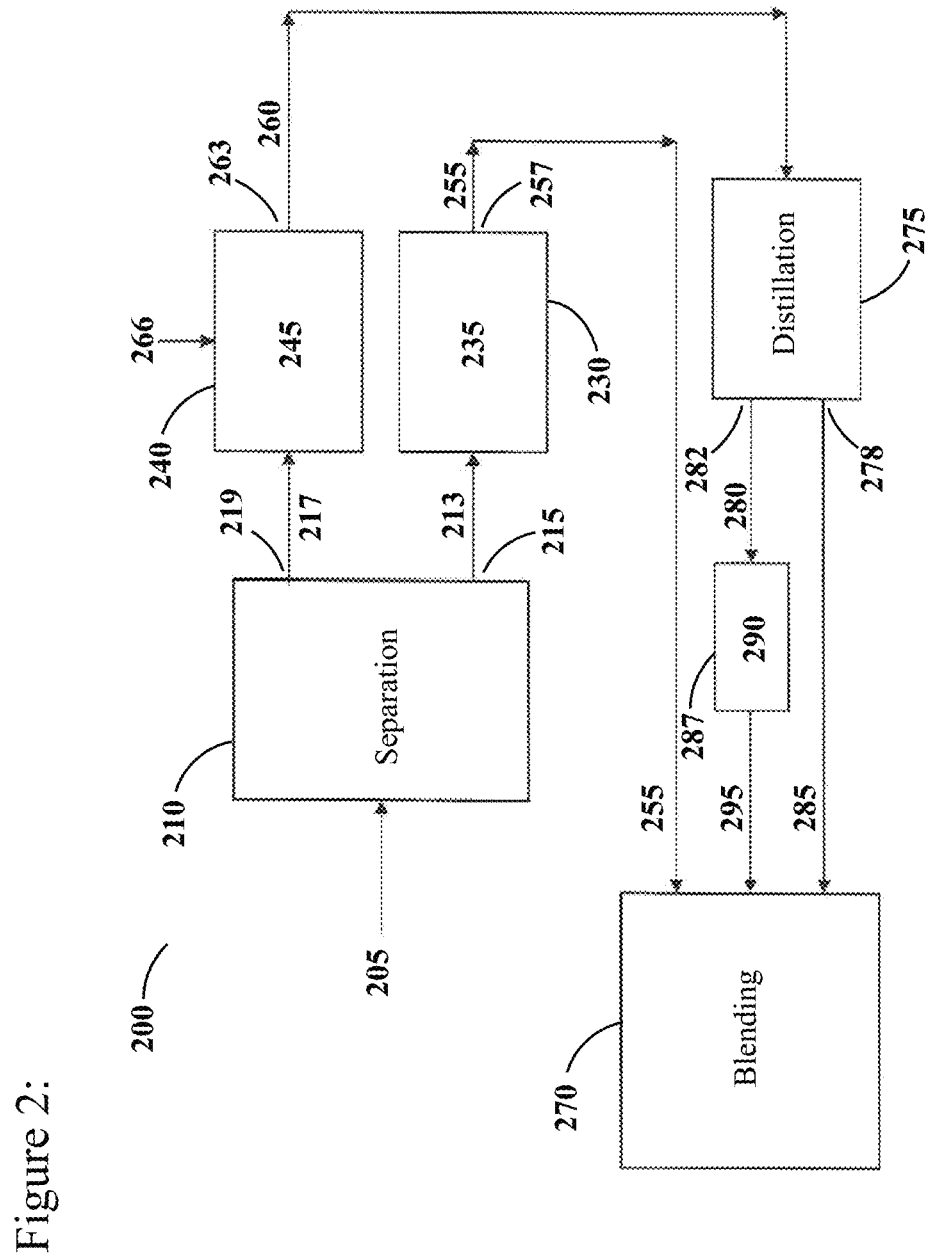
FIG. 2 is a simplified schematic representative of a second embodiment of the inventive processes and systems disclosed herein.

A second embodiment of the inventive processes and systems is depicted in FIG. 2. A selective reforming system 200 upgrades a hydrocarbon feedstock 205 comprising at least paraffins and naphthenes, and optionally aromatics. The hydrocarbon feedstock 205 is fed to a separation unit 210 that separates the hydrocarbon feedstock into a first fraction 213 comprising predominantly cyclic hydrocarbons (i.e., naphthenes and C6+ aromatics), and a second fraction 217 comprising predominantly C2-C12 n-paraffins and iso-paraffins. In certain embodiments, the separation unit 210 comprises an aromatic extraction unit or any other conventional method for separating cyclic hydrocarbons (i.e., naphthenes and aromatics) from paraffins. In another embodiment, the separation unit comprises a sorbent-based separation process. Such processes are conventional, and thus, are outside the scope of the present disclosure.

Following separation, the first fraction and the second fraction are reformed separately utilizing two distinct reforming processes. This serves to: 1) increase the overall yield of liquid product suitable for use as a gasoline blend stock, as well as, 2) improve the octane rating and vapor pressure properties of the combined liquid products from both reforming processes. Again, referring to FIG. 2, the first fraction 213 leaves the separation unit 210 by a first outlet 215 and is conveyed to a first reforming unit 230 that is a reactor containing at least a first reforming catalyst 235. The second fraction 217 leaves the separation unit 210 by a second outlet 219 and is conveyed to a second reforming unit 240 comprising at least a second reforming catalyst 245.

Generally-speaking, the first reforming unit is operated at conditions that selectively convert most of the naphthenes present in the first fraction to aromatics while minimizing the undesirable cracking of naphthenes, aromatics and residual paraffins present in the first fraction. This allows aromatics to pass through the first reforming unit largely unreacted. The mild reaction conditions maintained within the first reforming unit typically include a temperature in the range from 750° F. (399° C.) to 1100° F. (593° C.); alternatively, in the range from 800° F. (427° C.) to 1050° F. (565° C.); alternatively, in the range from 850° F. (454° C.) to 1050° F. (565° C.); alternatively, in the range from 900° F. (482° C.) to 1000° F. (538° C.). In certain embodiments, the first reforming unit is maintained at a reforming temperature that is 480° C. or less; optionally, ranging from 440° C. to 485° C.; optionally, ranging from 445° C. to 480° C.; optionally, ranging from 460° C. to 480° C.; optionally, ranging from 470° C. to 480° C.; optionally, ranging from 465° C. to 475° C.; optionally, ranging from 455° C. to 470° C. The pressure maintained within the first reforming unit is in the range from 3 Bar to 30 Bar, alternatively from 10 Bar to 28 Bar, alternatively from 15 Bar to 28 Bar, alternatively from 22 Bar to 26 Bar. In certain embodiments, the molar ratio of hydrogen to hydrocarbon (H2:HC) at the inlet to the first reforming unit ranges from 2:1 to 15:1, alternatively, ranges from 3:1 to 8:1, alternatively ranges from 4:1 to 7:1.

Again, referring to the embodiment depicted in FIG. 2, upon entering the first reforming unit 230, the first fraction 213 contacts the first reforming catalyst 235, which catalytically facilitates conversion of the first fraction 213 to produce a first reactor effluent 255 that characterized by an increased aromatics content and increased octane rating. The first reactor effluent 255 is conveyed out the first reforming unit 230 via a first reactor outlet 257 and is conveyed directly to blending unit 270 to be blended along with other refinery product streams into gasoline or other liquid transportation fuel.

In general, the first reforming unit contains at least one fixed catalyst bed. This fixed catalyst bed may optionally be employed in a swing reactor configuration for convenient regeneration of the catalyst. In alternative embodiments, the first reforming unit may contain a moving bed, fluidized bed, staged fluidized bed or ebullated bed to allow periodic, continuous, or semi-continuous regeneration. Further, the first reforming unit may comprise any other known catalyst bed configuration deemed advantageous to implementing the inventive process. Such catalyst bed configurations are well-understood in the art, and thus, will not be discussed further here.

Again, referring to the embodiment depicted in FIG. 2, the second fraction 217 is next conveyed to a second reforming unit 240 that contains a second reforming catalyst 245. Upon entering the second reforming unit 240, the second fraction 217 contacts the second reforming catalyst 245, which catalytically facilitates conversion of the first fraction 217 to produce a second reformer effluent 260 that exits the second reforming unit 240 via second reactor outlet 263. Within the second reforming unit 240, C4-C5 paraffins in the second fraction 217 are predominantly converted to C4-C5 olefins, while C6 paraffins may be selectively converted to C6 olefins or benzene, depending on conditions. C7 or larger paraffins that are present in the second fraction 217 are predominantly converted to C7+ aromatics. The second reformer effluent 260 additionally comprises a residual amount of unreacted paraffins.

Referring again to the embodiment depicted in FIG. 2, the second reformer effluent 260 is conveyed to a distillation unit 275. The distillation unit 275 operates in a conventional manner to separate a light hydrocarbons fraction 280 comprising from one to four carbons (C1-C4) from larger (C5+) hydrocarbons, typically, by boiling point. In certain alternative embodiments, the distillation unit separates hydrocarbons comprising from one to five carbon atoms (C1-C5) from hydrocarbons containing six or more carbon atoms (C6+). In the embodiment depicted in FIG. 2, the light hydrocarbons fraction 280 exits the distillation unit 275 through a first distillation unit outlet 282 and is conveyed to an oligomerization unit 287 comprising an oligomerization catalyst 290. The oligomerization unit 287 operates in a conventional manner to convert the light hydrocarbons fraction 280 to larger hydrocarbons 295 that are suitable for use as a blend component of liquid transportation fuel, and further, are characterized by a decreased vapor pressure. Larger hydrocarbons 295 are directed to a blending unit 270 to be blended into gasoline or other liquid transportation fuel.

The distillation unit 275 further produces a heavy hydrocarbons fraction 285 comprising hydrocarbons containing five or more carbon atoms that is suitable for use as a blend component of a liquid transportation fuel (e.g., gasoline). The heavy hydrocarbons fraction 285 exits the distillation unit 275 via a second distillation unit outlet 278 and is conveyed directly to blending unit 270 to be blended into gasoline or other liquid transportation fuel.

Speaking generally, the reaction conditions maintained in the second reforming unit are generally operating conditions that are suitable for the steam-stable second reforming catalyst, including a temperature in the range from 750° F. (399° C.) to about 1250° F. (677° C.); alternatively, in the range from 850° F. (454° C.) to 1100° F. (593° C.); alternatively, in the range from 900° F. (482° C.) to 1000° F. (538° C.). The pressure maintained in the second reforming unit is generally in the range from 1 Bar to 34.5 Bar; alternatively, in the range from 3 Bar to 20 Bar; alternatively, in the range from 2 Bar to 10 Bar; alternatively, in the range from 3 Bar to 7 Bar. The molar ratio of hydrogen to hydrocarbon (H2:HC) maintained inside the second reforming unit is within the range from 0 to 1, alternatively from 0.15 to 0.85, alternatively from 0.3 to 0.7, alternatively, 0.7:1 or less, alternatively 0.5:1 or less. The molar water to hydrocarbon ratio ($H_2O$:HC) maintained within the second reforming unit is in the range from 0.1:1 to 10:1, alternatively in the range from 1:1 to 6:1, alternatively, in the range from 2:1 to 6:1. The diluent liquid weight hourly space velocity (grams per hour of diluent per grams catalyst) maintained within the second reforming unit is in the range from 0.1 to 30, alternatively in the range from 1:1 to 6:1. The diluent may be, but is not limited to $CO_2$, $H_2O$ (as steam) or $N_2$. A low to moderate liquid weight hourly space velocity (LWHSV) is utilized that is in the range from 0.5 to 12 $hr^{-1}$ on a weight hydrocarbon rate per weight catalyst basis; alternatively ranging from 2 to 8 $hr^{-1}$; alternatively ranging from 1 to 3 $hr^{-1}$; alternatively ranging from 1.5 to 2.5 $hr^{-1}$.

An additional advantage of the inventive processes and systems is that separation of aromatic hydrocarbons from paraffins by the separation unit significantly decreases the quantity of aromatics that enter the second reforming unit (SRU), which is beneficial because the lifespan of the second reforming catalyst is extended in the absence of such naphthenes and aromatics, and further, the second reforming catalyst converts paraffins with increased efficiency in the absence of naphthenes and aromatics. In certain embodiments, >95%, >98%, or even >99% of aromatics are separated from the hydrocarbon feedstock in the separation unit to form at least a portion of the first fraction (and thereby prevented from entering the second reforming unit).

Speaking generally, the second reforming unit is configured to operate with higher efficiency when converting a highly paraffinic feedstock (e.g., a highly-paraffinic AEU raffinate) rather than a feedstock that comprises a significant percentage of naphthenes and/or aromatic hydrocarbons. The conditions maintained in the second reforming unit and the second reformer catalyst that is utilized together cause a feedstock predominantly comprising paraffins to be efficiently converted to desired hydrocarbon products (i.e., olefins, iso-olefins, aromatics, etc.) that are characterized by an increased octane rating and decreased vapor pressure (relative to a conventional one-step reforming process. In general, far less cracking occurs in the second reforming unit than the first reforming unit, in part due to the decreased (alternatively, total lack of) acidity of the second reforming catalyst relative to the first reforming catalyst. This is beneficial because cracking leads to increased production of light hydrocarbons (C1-C4) comprising four or less carbons. Such products cannot be easily blended into liquid hydrocarbon fuels due to their high vapor pressures.

In certain embodiments, the second fraction comprises predominantly n-paraffins and iso-paraffins containing 6-12 carbons (C6-C12), and less than about 10 wt. % naphthenes and aromatics (combined), alternatively less than about 5 wt. % naphthenes and aromatics (combined). In these embodiments, the second reforming unit predominantly converts C5 paraffins to C5 olefins, C6 paraffins to C6 olefins (alternatively, aromatics) and C7 and larger paraffins (C7+) to C7+ aromatics (e.g., alkyl aromatics). In this way, the second reforming unit achieves highly selective conversion of C5 paraffins to olefins, while maintaining high selectivity conversion of C6 and C7 paraffins to higher value products that are suitable for use as a gasoline blend component. The presence of non-reactive diluent in the second reforming unit increases the conversion of C5-C6 paraffins beyond that typically observed for non-diluent containing dehydrogenation systems. It is often preferable to selectively convert C6 paraffins to C6 olefins rather than aromatics, because this decreases production of benzene. Government regulations strictly limit the concentration of benzene in the final product gasoline due to toxicity concerns. However, it is desirable to maximize the conversion of C7+ paraffins to C7+ aromatics (i.e., alkyl aromatics) rather than C7+ olefins, as C7+ aromatic compounds are typically characterized by higher octane ratings than comparably-sized olefins.

In certain embodiments, the paraffinic feed that is fed to the second reforming unit may additionally comprise a supplemental co-feed stream comprising predominantly pentanes (optionally, butanes) that is mixed with the second fraction at a location downstream from the separation unit. In the embodiment depicted in FIG. 2, a supplemental light paraffins stream 266 is fed directly to the second reforming unit 240, although alternative embodiments (not depicted) may mix a light paraffins stream with the second fraction at a location immediately upstream from the second reforming unit. The light paraffins stream 266 may be derived from a variety of sources in a modern refinery, or may comprise a fraction derived from natural gas liquids. Addition of a supplemental light paraffins stream may be particularly advantageous in cooler climates or during cooler seasons, when atmospheric temperatures allow the blending of smaller olefins into gasoline while still meeting or exceeding governmental vapor pressure regulations for the final gasoline product. Alternatively, light olefins produced by the second reforming unit may be oligomerized downstream, as will be discussed in greater detail below.

Referring again to the embodiment depicted in FIG. 2, after leaving the second reforming unit 240, the second reformer effluent 260 is next conveyed to a distillation unit 275 that utilizes a conventional separation technology (e.g., distillation) for separating (C1-C4) light hydrocarbons 280 from larger C5+ hydrocarbons 285 that are suitable for conveying to blending unit 270 to be blended along with other refinery product streams into gasoline or other liquid transportation fuel. Commercial fuel blending is well-understood in the field, and therefore, will not be discussed further here.

The second reformer effluent 260 is conveyed to distillation unit 275. In certain alternative embodiments, the distillation unit 275 separates C1-C5 hydrocarbons from C6+ hydrocarbons. In the embodiment depicted in FIG. 2, a C1-C4 hydrocarbon fraction 280 exits the fractionation unit 275 through a first distillation unit outlet 282 and is conveyed to an oligomerization unit 287 comprising an oligomerization catalyst 290. The oligomerization unit 287 oligomerizes the C1-C4 hydrocarbon fraction 280 in a conventional manner to produce an oligomerization product 295 that comprises larger C5+ hydrocarbons and is characterized by decreased vapor pressure relative to the C-1-C4 hydrocarbon fraction 280. The oligomerization product 295 is conveyed to blending unit 270 to be blended along with other refinery product streams into gasoline or other liquid transportation fuel. The distillation unit 275 additionally produces a (C5+) hydrocarbons fraction 285 that exits the distillation unit 275 via a second distillation unit outlet 278 and is conveyed to blending unit 270 to be blended along with other refinery product streams into gasoline or other liquid transportation fuel.

In certain embodiments (described above), the hydrocarbon feedstock is first separated to produce a paraffin-enriched fraction and a naphthene-enriched fraction prior to reforming. While this separation does not quantitatively separate paraffins from naphthenes, it allows the naphthenes-enriched fraction to be reformed in a first reforming unit that is specifically-designed for reforming naphthenes in the absence of paraffins. Meanwhile, separation of the hydrocarbon feedstock also produces a second, paraffin-enriched fraction that is reformed in a second reforming unit that is specifically-designed for reforming paraffins in the absence of cyclic hydrocarbons. As a result, both the first and second reforming units operate more efficiently. The first reforming unit operates more efficiently with a feedstock that excludes most paraffins because paraffins, particularly those with less than eight carbons, are prone to significant detrimental cracking in the first reforming unit to form light gases, rather than higher-value liquid-range products that are suitable for use as a gasoline blend component.

Conversely, the second reforming unit is configured to utilize one or more second reformer catalyst(s) and maintain reaction conditions that facilitate selective upgrading of a paraffin-enriched fraction with increased efficiency and a decreased rate of coke formation on the second reforming catalyst (compared to a conventional reforming process that typically upgrades a hydrocarbon feedstock additionally comprising a significant percentage of naphthenes and/or aromatics).

Overall, separately reforming naphthenic vs paraffinic fractions of a hydrocarbon feedstock according to the inventive processes disclosed herein increases the overall combined liquid product yield, and decreases (C1-C4) light gas formation from a given quantity of hydrocarbon feedstock. The process also produces a liquid reformate product characterized by improved properties of increased octane rating and decreased vapor pressure.

In certain embodiments, the first reforming unit contains a catalyst bed or multiple catalyst beds, each comprising one or more reforming catalysts, where the first reforming unit is maintained at operating conditions that achieve increased liquid product yield of reformate (compared to conventional reforming processes) at a reforming temperature that is decreased by at least 5° C., alternatively at least 8° C., alternatively at least 10° C. relative to the temperature that is maintained in a the reforming unit of a conventional single-reactor reforming process that upgrades a hydrocarbon feedstock comprising both cyclic hydrocarbons and paraffinic hydrocarbons. In certain embodiments, the first reforming unit is maintained at a reforming temperature that is 480° C. or less; optionally, ranging from 440° C. to 485° C.; optionally, ranging from 445° C. to 480° C.; optionally, ranging from 460° C. to 480° C.; optionally, ranging from 470° C. to 480° C.; optionally, ranging from 465° C. to 475° C.; optionally, ranging from 455° C. to 470° C. Decreasing the operating temperature maintained within the first reforming unit by at least 5° C. (relative to the temperature typically maintained in a conventional, one step reforming unit) not only saves on system operating costs, but decreases the deactivation rate of the first reforming catalyst. In contrast, the feedstock and operating conditions utilized in a typical conventional reforming unit are generally believed to expose the first reforming catalyst to significant concentrations of olefins and dienes at a temperature that increases the rate of coke formation on the reforming catalyst, with a consequent decrease in catalyst lifespan.

In certain embodiments, the second reforming unit comprises at least one fixed catalyst bed, which in turn comprises at least one second reformer catalyst. Embodiments that utilize a fixed bed configuration may optionally be employed in a swing reactor configuration. In alternative embodiments, the second reforming unit may comprise a moving bed, fluidized bed, staged fluidized bed, ebullated bed, or any other configuration deemed advantageous to employ the first reformer catalyst utilized in a given embodiment, as is well-understood in the art.

The second reforming catalyst contained within the second reforming unit converts C4-C5 paraffins to olefins by dehydrogenation, while simultaneously minimizing cracking reactions that produce light hydrocarbons (C1-C4) that cannot be utilized as a blend component of a liquid transportation fuel. Minimizing production of light hydrocarbons is desirable, as this correlates inversely with the conversion to products characterized by increased octane rating and decreased vapor pressure, and that are suitable for use as a liquid transportation fuel blend component. Embodiments that subsequently oligomerize these C4-C5 olefins in an oligomerization reactor located downstream from the second reforming unit assist in further improving the properties of the liquid reformate product, but the additional improvement is generally minor in most embodiments, relative to the improvement provided by the inventive process.

In these same embodiments, the second reforming catalyst contained within the second reforming unit converts C7 paraffins in the feed to toluene. This conversion is highly selective, with minimal residual conversion to C7 olefins or cracked products. Conversion of C7 paraffins primarily to aromatics rather than olefins or cracked products provides an additional increase in the octane rating of the liquid reformate product.

In certain embodiments, a small hydrogenation reactor located downstream from the second reforming unit receives and selectively hydrogenates dienes present in the second reformer effluent to produce a treated second reformer effluent that is then sent to the distillation unit. Such hydrogenation processes and systems are conventional, and thus, will not be discussed further.

In all embodiments, the first and second reforming catalysts are materially-different catalysts that are derived from mutually-exclusive subsets of reforming catalysts. The first reforming catalyst functions to more-efficiently reform naphthenic hydrocarbons to aromatic compounds characterized by a higher-octane rating and/or lower vapor pressure, while the second reforming catalyst functions to more-efficiently reform heavy paraffinic (n- and iso-) hydrocarbons to aromatic compounds characterized by a higher octane rating and/or lower vapor pressure, and light paraffinic hydrocarbons to olefins suitable for blending or further upgrading.

The first reforming catalyst is generally a conventional naphtha reforming catalyst that is well-suited for reforming naphthenes to aromatics. Such catalysts are bi-functional catalysts consisting of a catalytically effective amount of one or more metal(s) or metal oxide(s) impregnated on a support, including, but is not limited to, alumina, chlorided alumina, fluorided alumina, modified zeolites and carbon. The support is generally unsuitable for reforming in the presence of water or steam, and catalytic activity degrades rapidly in the presence of steam. The impregnated metal(s) generally catalyze hydrogenation and dehydrogenation reactions, while the support often (but not always) comprises acidic sites and promotes isomerization and cyclization reactions. Sulfur and nitrogen impurities in the feed are highly detrimental to the function of the first reforming catalyst at levels above about 1 ppm (typically). Sulfur deactivates metal sites, reducing dehydrogenation, while nitrogen can deactivate acid sites, reducing isomerization and cyclization. Modification of the catalytic function is sometimes achieved by impregnating a second or third metal onto the support, which serves to decrease the rate of coking. In certain embodiments, the first reforming catalyst comprises at least one metal selected from Group VIIB, Group VIIIB, Group IIB, Group IIIA or Group IVA of the Periodic Table. In certain embodiments, the first reforming catalyst comprises a metal such as Pt, Ir, Rh, Re, Sn, Ge, In, or combinations of two or even three of these metals. Many such metal combinations have been well-characterized in the field as suitable for naphtha reforming.

The support of the first reforming catalyst is generally characterized by a significantly higher acidity than the support of the second reforming catalyst. It is important to note that the acidic support of the first reforming catalyst is rapidly degraded in the presence of steam, and therefore is unsuitable for steam-reforming applications. Furthermore, the second reforming catalyst is resistant to sulfur and nitrogen contaminants in the feed, and in some embodiments retains catalytic activity in the presence of as much as 100 ppm of sulfur and nitrogen. These are among the major differences that distinguish the first reforming catalyst from the second reforming catalyst in the present inventive processes and systems.

The second reforming catalyst can be generally described as structurally-stable in the presence of steam, and is generally much less sensitive to the presence of sulfur and nitrogen contaminants in the feedstock (as compared to the first reforming catalyst) typically being able to withstand up to 100 ppm of either sulfur or nitrogen without adversely affecting catalytic activity. The second reforming catalyst further comprises a catalytically-effective amount of at least one metal from Group VIII of the Periodic Table, including Ru, Pt, Pd, Os, Ir, Ni, Rh and combinations thereof. In certain embodiments, the second reforming catalyst is composed of a solid support selected from Group II aluminate spinels, or mixtures thereof, impregnated with a catalytically-effective amount (i.e., at least about 0.01 percent by weight, and preferably from about 0.1 percent to about 10 percent by weight, based on the weight of the support) of at least one of the Group VIII metals listed above; and, optionally, up to about 10 wt. % (based on the weight of the support), of a co-promoter material selected from the group consisting of tin, lead, germanium, Group IA metals, and combinations thereof. Group II aluminate spinels are compounds of the formula $M(AlO_2)_2$ or $MO.Al_2O_3$, wherein M is a divalent Group IIA or Group IIB metal (e.g., Zn, Mg, Be, Ca).

The processes and systems described herein provide the advantage of extending catalyst lifespan of both the first and second reforming catalysts by exposing each catalyst to only a fraction of the total hydrocarbon feedstock. Due to the lessening or absence of feed paraffins, the first reforming unit can operate at a lower severity (defined as a lower weight-averaged inlet temperature, or WAIT) than a conventional reformer and achieve the same RON and improved liquid yield. This lower WAIT also results in a decreased coking rate and an extended useful lifespan for the reforming catalyst contained within the first reforming unit. This is possibly due to reduced formation of olefins and dienes on the catalyst surface. Alternatively, the first reforming unit in this embodiment can operate at a higher severity and, due to the improved feed quality, will achieve the same liquid yield as a conventional reformer but achieve significantly higher octane reformate. The first reforming unit is exposed to less olefins and dienes, which it is generally hypothesized contributes to a decreased coking rate and an extended useful lifespan for the reforming catalyst contained within the first reforming unit.

The lifespan of the second reforming catalyst is extended by exposure to less naphthenes and aromatics, which can cause premature coking of the second reforming catalyst. Further, removing cyclic hydrocarbons from the feedstock fraction that is fed to the second reforming catalyst allows the conditions utilized in the second reforming unit to be tailored for maximizing the conversion of paraffins to higher value olefins and aromatics (characterized by increased octane rating and decreased vapor pressure) that are useful as liquid transportation fuel blend stock.

The hydrocarbon feedstock may comprise, for example, (but not limited to) a refinery stream including at least one of: a refinery raffinate, hydrotreated straight run naphtha, coker naphtha, hydrocracker naphtha (either pre- or post-hydrotreating), refinery hydrotreated heavy naphtha, refinery hydrotreated coker naphtha, isomerate (pre or post-hydrotreating) comprising hydrocarbons containing from four to six carbons, and hydrocarbons containing four or more carbons that are derived from natural gas liquids. In embodiments where C6 hydrocarbons are present in the hydrocarbon feedstock, any benzene in the product reformate may be alkylated in a later step prior to sending the reformate to a blending unit. As previously mentioned, the process may be extended to include C4 paraffins; in this case the C4 paraffins are selectively converted to C4 olefins, then optimally oligomerized to larger hydrocarbons.

A typical hydrocarbon feedstock for the inventive processes and systems will generally comprise both cyclic hydrocarbons and paraffinic hydrocarbons, as the improvement provided by the process increases the overall yield and quality of the reformate product obtained from feeds that are not exclusively either paraffinic or aromatic/naphthenic in composition. The feedstock comprises hydrocarbons and may be characterized by several established parameters for measuring feedstock quality, such as the boiling point range and the content of naphthenes (N) and aromatics (A) (as defined by the expression: N+2A). The feedstock may be also characterized by percentage of hydrocarbons in the feedstock that comprise a given number of carbon atoms. Typically, the hydrocarbon feedstock comprises hydrocarbons containing four to twelve carbon atoms (C4-C12) characterized by a boiling point range from −12° C. to about 230° C.; alternatively, the hydrocarbon feedstock comprises hydrocarbons containing five to twelve carbon atoms (C5-C12) characterized by a boiling point range from about 27° C. to about 230° C.; alternatively, the hydrocarbon feedstock comprises hydrocarbons containing five to ten carbon atoms (C5-C10) characterized by a boiling point range from about 27° C. to about 185° C.; alternatively, the hydrocarbon feedstock comprises hydrocarbons containing five to nine carbon atoms (C5-C9) characterized by a boiling point range from about 27° C. to about 160° C.

In a conventional reforming unit, the quality of the feedstock (as indicated by N+2A) dictates operating parameters for reforming to achieve desired yield and/or increase in octane rating. A higher N+2A value indicates the feed is rich in Naphthenes and Aromatics, which is important because a feedstock comprising a larger percentage of naphthenes and aromatics requires less severe reforming process conditions to achieve a given octane rating improvement than a feedstock that comprises a larger percentage of paraffins. The N+2A value for a hydrocarbon feedstock suitable for use with the present inventive systems and processes may range from as low as 35 to 85, alternatively, in the range from 45 to 85, alternatively, in the range from 55 to 85. The first fraction that is fed to the first reforming unit (in the second embodiment only) is enriched for naphthenes and aromatics, and is characterized by a N+2A value that may range from 40 to 140, alternatively, in the range from 50 to 140, alternatively, in the range from 60 to 140, alternatively, in the range from 70 to 140, alternatively, in the range from 80 to 140.

EXAMPLES

The following examples are provided to help illustrate the innovation encompassed within the inventive processes and systems described herein. However, the scope of the invention is not intended to be limited to the embodiments or examples that are specifically disclosed. Instead, the scope is intended to be as broad as is supported by the complete specification and the appending claims.

Example 1

Table 1 demonstrates the advantage to converting a highly paraffinic feedstock to by a reforming catalyst that is selective for reforming paraffins (corresponding to the second reforming catalyst described herein). A feedstock comprising 90 wt % C5 and C7 paraffins was fed to a reactor maintained at a temperature of 1020° F. (549° C.), a reactor pressure of 68 psig, a liquid weight hourly space velocity of 4.2 hr−1, a $H_2$:hydrocarbon ratio of 0.5 (mol/mol), and a H2O:HC ratio of 3 (mol/mol). The catalyst utilized was a steam reforming catalyst comprising zinc-aluminate spinel impregnated with platinum metal. The first column of Table 1 shows the molecular composition of the paraffinic feedstock (where P=paraffins, N=naphthenes, O=olefins, D=dienes and A=aromatics) in wt. %., while the second column shows the molecular composition of the reformed product. The results show that 37.5 wt. % of the feed was converted to aromatics (with minimal benzene production) while 16.3 wt. % of the feed was converted to olefins. The research octane rating (RON) of the product was improved by 37.6, while the liquid product yield was nearly 84.3 vol. %.

TABLE 1

Composition of a paraffinic feedstock and a liquid reformate product derived from reforming the feedstock with a catalyst that is selective for reforming paraffins in the absence of cyclic hydrocarbons.

| Composition | Feed wt. % | Product wt. % |
| --- | --- | --- |
| H2 | 1.1 | 2.5 |
| CO + CO2 | 0.0 | 1.3 |
| C1-C4 | 0.0 | 3.1 |
| P5 | 29.4 | 14.7 |
| N5 | 0.0 | 0.2 |
| O5 (n + i + cyclo) | 0.0 | 5.2 |
| D5 | 0.0 | 0.2 |
| P6 | 0.0 | 0.6 |
| N6 | 0.5 | 0.4 |
| O6 (n + i + cyclo) | 0.0 | 0.8 |
| D6 | 0.0 | 0.6 |
| A6 | 0.0 | 1.0 |
| P7 | 60.2 | 15.8 |
| N7 | 5.3 | 1.1 |

TABLE 1-continued

Composition of a paraffinic feedstock and a liquid reformate product derived from reforming the feedstock with a catalyst that is selective for reforming paraffins in the absence of cyclic hydrocarbons.

| Composition | Feed wt. % | Product wt. % |
|---|---|---|
| O7 (n + i + cyclo) | 1.1 | 11.3 |
| D7 | 0.0 | 1.3 |
| A7 | 2.1 | 38.7 |
| C8+ | 0.2 | 0.7 |
| Other | 0.0 | 0.6 |
| C5+ RON | 59.3 | 96.9 |
| C5+ (vol %) |  | 84.3 |

Example 2

Computer-based modeling was conducted to estimate both the liquid product yield and the product properties resulting from implementing the first embodiment of the inventive processes and systems, as generally depicted in the diagram of FIG. 1. In this embodiment, the first reforming unit (FRU) containing a naphtha reforming catalyst (first reforming catalyst) comprising an alumina support impregnated with platinum was operated at relatively mild temperature conditions that would predominantly convert naphthenes in the hydrocarbon feedstock to aromatics without significant cracking activity, thus allowing paraffins in the hydrocarbon feedstock to pass through the first reforming unit mostly unreacted. Separation of a paraffin-enriched fraction from the first reformer effluent by a separator (SEP) was modeled as occurring in an aromatic extraction unit, based upon publicly-available empirical data. The calculated paraffinic fraction (from the first reactor effluent) was then modeled as feedstock for a second reforming unit (SRU) comprising a steam-active reforming catalyst comprising a zinc aluminate support and impregnated with platinum and tin.

A kinetic model based on existing empirical data was utilized to calculate C5+ reformate yield, product RVP, and WAIT (weight averaged inlet temperature) for the first reforming unit as a function of pressure, feed quality (N+2A), the desired product octane rating (RON), space velocity and feed composition. Two feed streams comprised the hydrocarbon feedstock for this example: a mixed pentanes stream (9 vol % of total) routed directly to second reforming unit (to mix with the second fraction), and a heavy naphtha (91 vol % of total), sent to the first reforming unit.

A correlative model based on empirical data was used to predict the C5+ liquid yield from the second reforming unit based on product research octane number (RON). The relative sizes of the separated first and second fractions were calculated using a known correlation between reformate octane rating and the quantity of aromatics in the stream. The change in Reid Vapor Pressure (RVP) of the light hydrocarbon fraction fed to the oligomerization unit (see FIG. 1, item 180) was estimated using empirical data from a typical light FCC naphtha feed, which is about 1 psia (0.07 bar). RON of the combined products of the first and second reforming units was calculated using volumetric linear octane blending, while combined product RVP was calculated using a commercially-available vapor pressure blending index.

To demonstrate the advantages of this embodiment of the inventive processes and systems, the inventive process is compared to a conventional reforming process that comprises a single-step reforming utilizing a conventional naphtha reforming catalyst (alumina impregnated with Pt). Calculated feedstock molecular composition and properties, operating conditions, estimated product yield, and product properties are listed for the conventional process (Column 2), and the inventive process (Column 3). In this example, liquid reformate product yield (i.e., C5+ reformate) was the independent variable. Operating conditions were utilized for each process that would be expected to yield of 65 vol % of C5+ liquid reformate product.

TABLE 2

Conditions required for conventional reforming process (Column 2) and inventive embodiment 1 (Column 3) to produce an equivalent yield of liquid reformate product.

| Process | Parameter | Base Case (FRU) | FRU-SEP-SRU |
|---|---|---|---|
| FRU | Separator pressure (bar) |  | 17.6 |
|  | Feed N + 2A (vol %) | 53 | 53 |
|  | Feed P + I (vol %) | 61 | 61 |
|  | Feed N (vol %) | 26 | 26 |
|  | Feed A (vol %) | 13 | 13 |
|  | LWHSV (hr − 1) | 0.8 | 0.8 |
|  | H2 recycle/feed rate (mscf/bbl) | 8.0 | 8.0 |
|  | Inlet H2O/HC (mol/mol) | 0 | 0 |
|  | First reactor inlet press. (bar) | 26.2 | 26.2 |
|  | WAIT* (° C.) | 492 | 481 |
|  | Product RON | 98.3 | 93.9 |
|  | Liq. Product Yield (vol %) | 60.9 | 66.9 |
| SRU | Feed P + I (vol %) |  | 94 |
|  | Feed N (vol %) |  | 4 |
|  | Feed A (vol %) |  | 1 |
|  | Inlet H2/HC (mol/mol) |  | 0.5 |
|  | Inlet H2O/HC (mol/mol) |  | 3 |
|  | Inlet pressure (bar) |  | 5.7 |
|  | Average Bed temperature (° C.) |  | 532 |
|  | LWHSV (hr − 1) |  | 2 |
|  | Product RON |  | 89.2 |
|  | Liq. Product Yield (vol %) |  | 85.5 |
| Final Product | Product RON | 94.5 | 104.7 |
|  | Liq. Product Yield (vol %) | 65 | 65 |
|  | Product RVP (bar) | 0.42 | 0.30 |

*Weight-averaged inlet temperature

Figure 3:
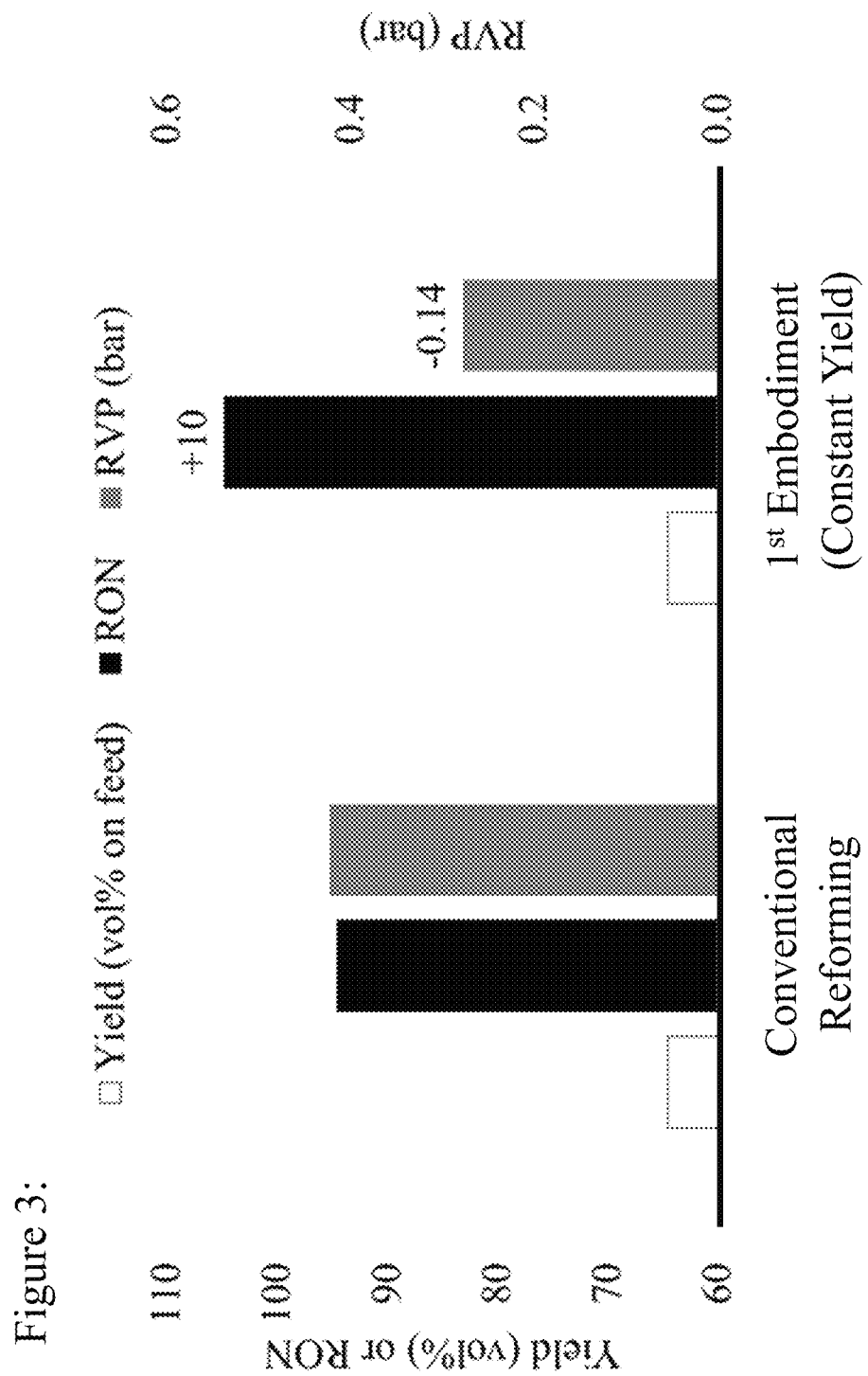
FIG. 3 is a bar graph that compares the properties of a product produced by one embodiment of the present inventive disclosure with the properties of a product produced by a conventional reforming process.

Table 2 demonstrates that using the operating conditions required for each process (conventional versus inventive) to produce a liquid product yield (of C5+ reformate) equal to 65 vol. %, the inventive process produced a product characterized by a significantly increased RON (104.7 versus 94.5) and a significantly decreased vapor pressure (4.3 versus 6.1 psia) versus the product of a conventional reforming process. These results are visualized in the bar graph shown in FIG. 3.

Example 3

Computer-based modeling was conducted to estimate both the liquid product yield and the product properties resulting from implementing the second embodiment of the inventive processes and systems, as generally depicted in the diagram of FIG. 2, particularly with regards to increased product yield and improved product properties. In this experiment, the hydrocarbon feedstock was first separated in a separator (SEP) comprising an aromatic extraction unit to produce a naphthenes/aromatics-enriched first fraction, and a paraffins-enriched second fraction.

The naphthenes/aromatics-enriched first fraction was modeled as feedstock for upgrading in a first reforming unit (FRU) containing a naphtha reforming catalyst (first reforming catalyst) comprising an alumina support impregnated with platinum. The first reforming unit was operated at relatively mild temperature (decreased by 11° C. relative to the conventional reforming process shown in column 3 of Table 3) that would predominantly convert naphthenes to aromatics without significant cracking activity, and further would decrease the rate of catalyst coking (relative to operating at a higher temperature). Meanwhile, the separated paraffins-enriched second fraction was modeled as feedstock for a second reforming unit containing a commercially-available steam-active reforming catalyst comprising a zinc aluminate support impregnated with platinum.

A kinetic model based on existing empirical data was utilized to calculate C5+ reformate yield, product RVP, and WAIT (weight averaged inlet temperature) for the first reforming unit as a function of pressure, feed quality (defined by the equation: N+2A), the desired product research octane number (RON), space velocity and feed composition. Two feed streams comprised the hydrocarbon feedstock for this example: a mixed pentanes stream (9 vol. % of total) routed directly to a second reforming unit (to mix with the second fraction), and a heavy naphtha (91 vol. % of total), which was fed to the separation unit as a first process step, prior to routing the naphthenes-enriched first fraction to the first reforming unit and a paraffins-enriched second fraction to the second reforming unit.

A correlative model based on empirical data (RON 40-100) was used to predict the C5+ liquid yield from the second reforming unit based on product RON. The change in Reid Vapor Pressure (RVP) of the oligomerization feed stream was estimated using empirical data from a typical light FCC naphtha feed, which is about 1 psia (0.07 bar). RON of the combined products of the first and second reforming units was calculated using volumetric linear octane blending, while combined product RVP was calculated using the a commercially-available vapor pressure blending index.

To demonstrate the advantages of this embodiment of the inventive processes and systems, the inventive process was compared to a conventional reforming process that comprises a single-step reforming utilizing a conventional naphtha reforming catalyst (alumina impregnated with Pt). Calculated feedstock molecular composition and properties, operating conditions, estimated product yield, and product properties are listed for the conventional process (Column 3), and the inventive process (Column 4). In this example, RON was the independent variable. Operating conditions were utilized for each process that would be expected to produce a liquid product characterized by a RON of 95.0.

TABLE 3

Conditions required to produce a liquid reformate product characterized by an equivalent octane rating (RON = 95.0) for a conventional one-step reforming process (Column 3) and a second inventive embodiment (Column 4) illustrated by the schematic diagram of FIG. 2.

| Process | Parameter | Base Case (CRU Only) | SEP with FRU/SRU |
|---|---|---|---|
| SEP | Inlet pressure (bar) | | 17.6 |
| FRU | Feed N + 2A (vol %) | 51.8 | 74.8 |
| | Feed P + I (vol %) | 61.3 | 44.2 |
| | Feed N (vol %) | 25.6 | 36.9 |
| | Feed A (vol %) | 13.1 | 18.9 |
| | LWHSV (hr − 1) | 0.8 | 0.8 |
| | FRU H2 Recycle/feed rate | 8.0 | 8.0 |
| | FRU Inlet H2O/HC (mol/mol) | 0 | 0 |
| | FRU Inlet pressure (bar) | 26.2 | 26.2 |
| | WAIT* (° C.) | 491 | 480 |
| | Product RON | 98.2 | 96.2 |
| | Liq. Product Yield (vol %) | 73.5 | 84.8 |
| SRU | Feed P + I (vol %) | | 100 |
| | Feed N (vol %) | | 0 |
| | Feed A (vol %) | | 0 |
| | Inlet H2/HC (mol/mol) | | 0.5 |
| | Inlet H2O/HC (mol/mol) | | 3 |
| | SRU Inlet pressure (bar) | | 5.7 |
| | Average Bed temperature (° C.) | | 578 |
| | LWHSV (hr − 1) | | 4 |
| | Product RON | | 100 |
| | Liq. Product Yield (vol %) | | 66.4 |
| Final Product | Product RON | 95 | 95 |
| | Liq. Product Yield (vol %) | 75.9 | 80.8 |
| | Product RVP (bar) | 0.40 | 0.34 |

*Weight-averaged inlet temperature

Figure 4:
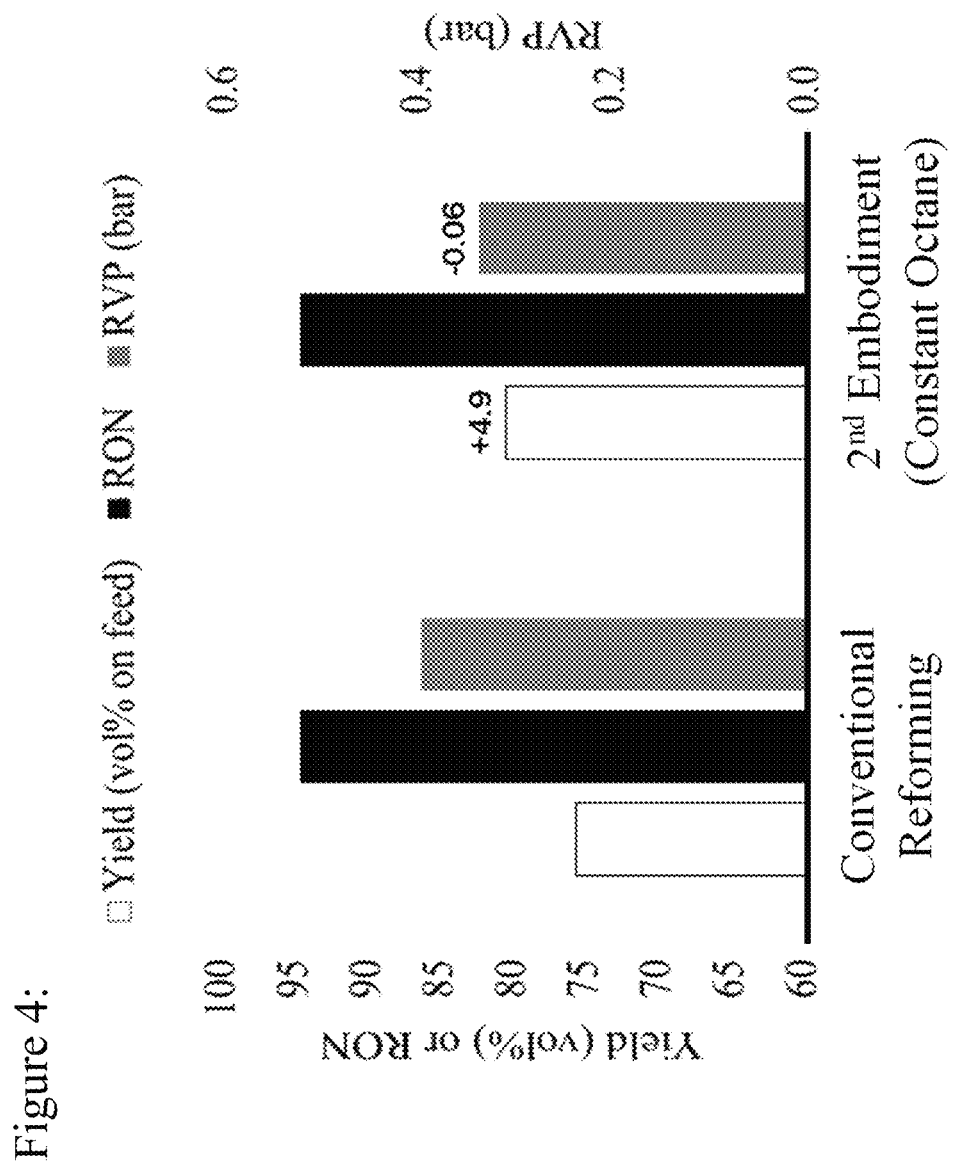
FIG. 4 is a bar graph that compares the properties of a product produced by one embodiment of the present inventive disclosure with the properties of a product produced by a conventional reforming process.

Table 3 demonstrates that at the operating conditions required for each process (conventional versus inventive) to produce a liquid reformate product characterized by a RON of 95, the inventive process produced a significantly larger yield of liquid reformate product (80.8 vol. % versus 75.9 vol. %) and the liquid reformate product was characterized by a significantly decreased RVP (0.40 for base case versus 0.34 bar for the inventive case). These results are visualized in the bar graph shown in FIG. 4.

DEFINITIONS

As used herein, the term "octane rating" refers to "research octane number" (RON), calculated by a well-established process for indicating the antiknock properties of a fuel based on a comparison with a mixture of isooctane and heptane.

In closing, it should be noted that each claim listed below is hereby incorporated into this specification as an additional embodiment of the inventive disclosure. It should be understood that various changes, substitutions, and alterations can be made to the invention as described herein without departing from the spirit and scope of the invention as defined by the claims appended below. Those skilled in the art may be able to study the description and identify obvious variants and equivalents of the invention that are not exactly as described herein. It is the intent of the inventors that obvious variants and equivalents of the invention are within the scope of the claims appended below. Further, the description, abstract and drawings are not intended to limit the scope of the invention narrower than the full scope provided by the claims.

We claim:

1. A system for reforming a hydrocarbon feedstock, comprising:
 a) A first reforming unit that contains a first reforming catalyst comprising a solid support that comprises acidic sites,
  wherein the first reforming unit is operable to receive a hydrocarbon feedstock comprising paraffins and naphthenes, each of which comprises from four to twelve carbon atoms, wherein the hydrocarbon feedstock is characterized by a boiling point ranging from −12° C. to 230°C.,
  wherein the first reforming unit is operable to facilitate contact between the hydrocarbon feedstock and the first reforming catalyst to produce a first reformer effluent comprising predominantly aromatics, wherein the first reforming unit is further operable to maintain a temperature, a pressure and a hydrogen to hydrocarbon ratio that facilitates the catalytic aromatization of naphthenes in the feedstock by the first reforming catalyst, while simultaneously facilitating the catalytic dehydrogenation, catalytic cracking, or both, of less than 50% of paraffins in the hydrocarbon feedstock;

b) A separation unit operable to separate the first reformer effluent into a first fraction that comprises an increased percentage (by weight) of aromatics relative to the first reformer effluent, and a second fraction that comprises an increased percentage (by weight) of paraffins relative to the first reformer effluent;

c) A second reforming unit that contains a second reforming catalyst comprising a solid support that does not contain acidic sites, wherein the second reforming unit is operable to receive the second fraction and facilitate contact between the second fraction and the second reforming catalyst and further operable to maintain a temperature, a pressure and a hydrogen to hydrocarbon ratio that are suitable to facilitate catalytic dehydrogenation of at least 50 wt. % of paraffins present in the second fraction to produce a second reformer effluent comprising predominantly olefins containing four or five carbon atoms and unreacted paraffins, wherein the second reformer effluent is characterized by an increased research octane number relative to the second fraction;

d) a distillation unit operable to separate the second reformer effluent into a light hydrocarbons fraction comprising hydrocarbons containing one to four carbon atoms, and a heavy hydrocarbons fraction comprising hydrocarbons containing five or more carbon atoms, and e) an oligomerization reactor containing an oligomerization catalyst, wherein the oligomerization reactor is operable to receive the light hydrocarbon fraction and facilitate contact between the light hydrocarbon fraction and the oligomerization catalyst at conditions of temperature and pressure suitable to produce an oligomerization product comprising larger hydrocarbons containing five or more carbon atoms that are characterized by a decreased vapor pressure.

2. The system of claim 1, wherein the oligomerization reactor is operable to receive the light hydrocarbon fraction and facilitate contact between the light hydrocarbon fraction and the oligomerization catalyst at conditions of temperature and pressure suitable to produce an oligomerization product comprising larger hydrocarbons containing six or more carbon atoms that are characterized by a decreased vapor pressure.

3. The system of claim 1, wherein the second reforming unit is additionally operable to receive a supplemental light paraffins stream comprising paraffins containing four or five carbon atoms and further operable to facilitate mixing of the supplemental light paraffins stream with the second fraction.

4. The system of claim 1, wherein the first reforming catalyst comprises a structure that is adversely affected by contact with steam, wherein the second reforming catalyst comprises a structure that is not adversely affected by contact with steam.

5. The system of claim 1, wherein the first reforming catalyst comprises a solid support selected from zeolite, silica, alumina, chlorided alumina and fluorided alumina.

6. The system of claim 5, wherein the first reforming catalyst is a bi-functional naphtha reforming catalyst that additionally comprises at least one metal selected from Group VIIB, Group VIIIB, Group IIB, Group IIIA and Group IVA of the Periodic Table.

7. The system of claim 6, wherein the first reforming catalyst further comprises at least one metal selected from Pt, Ir, Rh, Re, Sn, Ge and In.

8. The system of claim 1, wherein the second reforming catalyst comprises a solid support consisting of Group II aluminate spinels according to the formula $M(AlO_2)_2$ or $MO.Al_2O_3$, wherein M is a divalent Group IIA or Group IIB metal.

9. The system of claim 8, wherein the second reforming catalyst further comprises at least one metal from Group VIIIB of the Periodic Table.

10. The system of claim 9, wherein the second reforming catalyst further comprises at least one co-promoter selected from the group consisting of As, Sn, Pb, Ge and Group IA metals.

11. The system of claim 1, wherein the first reforming unit is operable to receive a hydrocarbon feedstock comprising at least one of: a refinery raffinate, hydrotreated straight run naphtha, coker naphtha, hydrocracker naphtha, hydrotreated hydrocracker naphtha, refinery hydrotreated heavy naphtha, refinery hydrotreated coker naphtha, or C4+ hydrocarbons derived from natural gas liquids.

12. The system of claim 1, wherein the first reforming unit is operable to receive a hydrocarbon feedstock that is characterized by a boiling point range from 27° C. to 230° C. and that comprises hydrocarbons that contain from five to twelve carbon atoms.

13. The system of claim 1, wherein the first reforming unit is operable to receive a hydrocarbon feedstock that is characterized by a boiling point range from 27° C. to 185° C. and that comprises hydrocarbons that contain from five to ten carbon atoms.

14. The system of claim 1, wherein the first reforming unit is operable to receive a stream of hydrogen and further operable to maintain a hydrogen to hydrocarbon feedstock ratio of at least 2:1.

15. The system of claim 1, wherein the second reforming unit is operable to receive a stream of hydrogen and further operable to maintain a hydrogen to hydrocarbon ratio of 0.7:1 or less.

16. The system of claim 1, wherein the second reforming unit is operable to maintain a temperature and pressure that facilitates the catalytic dehydrogenation of at least 60 wt. % of the paraffins in the second fraction by the second reforming catalyst.

17. The system of claim 1, wherein the second reforming unit is operable to maintain a temperature and pressure that facilitates the catalytic dehydrogenation of at least 70 wt. % of the paraffins in the second fraction by the second reforming catalyst.

18. The system of claim 1, wherein the first reforming unit is operable to maintain a temperature and pressure and a hydrogen to hydrocarbon ratio that facilitates the catalytic conversion of less than 40% of paraffins in the hydrocarbon feedstock.

* * * * *